(12) United States Patent
Wu et al.

(10) Patent No.: US 12,013,606 B2
(45) Date of Patent: Jun. 18, 2024

(54) DISPLAY PANEL, DISPLAY DEVICE, AND VEHICLE MONITORING DEVICE

(71) Applicant: WUHAN CHINA STAR OPTOELECTRONICS TECHNOLOGY CO., LTD., Hubei (CN)

(72) Inventors: Teng Wu, Hubei (CN); Fancheng Liu, Hubei (CN); Song Li, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/618,461

(22) PCT Filed: Nov. 23, 2021

(86) PCT No.: PCT/CN2021/132506
§ 371 (c)(1),
(2) Date: Dec. 11, 2021

(87) PCT Pub. No.: WO2023/082328
PCT Pub. Date: May 19, 2023

(65) Prior Publication Data
US 2024/0012279 A1 Jan. 11, 2024

(30) Foreign Application Priority Data
Nov. 15, 2021 (CN) .......................... 202111350138.0

(51) Int. Cl.
*G02F 1/1335* (2006.01)
*G02F 1/1333* (2006.01)
*G02F 1/1343* (2006.01)

(52) U.S. Cl.
CPC .. *G02F 1/133512* (2013.01); *G02F 1/133357* (2021.01); *G02F 1/133514* (2013.01); *G02F 1/134309* (2013.01)

(58) Field of Classification Search
None
See application file for complete search history.

(56) References Cited

U.S. PATENT DOCUMENTS

| 2015/0124327 | A1* | 5/2015 | Tozune | .................. G02B 1/111 |
| | | | | 106/287.19 |
| 2015/0220212 | A1 | 8/2015 | Kim | |
| 2020/0236259 | A1* | 7/2020 | Nakamura | ............. H10K 59/65 |

FOREIGN PATENT DOCUMENTS

| CN | 106711179 A | 5/2017 |
| CN | 108321176 A | 7/2018 |

(Continued)

OTHER PUBLICATIONS

International Search Report in International application No. PCT/CN2021/132506, dated Jul. 27, 2022.

(Continued)

*Primary Examiner* — Phu Vu
(74) *Attorney, Agent, or Firm* — PV IP PC; Wei Te Chung; Zhigang Ma

(57) ABSTRACT

A display panel, a display device, and a vehicle monitoring device are provided. The display panel includes a display area and a light-transmitting area adjacent to the display area. The display panel includes a first base and a second base opposite to each other and a liquid crystal layer disposed between the first base and the second base. The display panel includes a planarization layer, a passivation layer, and an electrode layer disposed on a side of the first (Continued)

base close to the second base. Further, an orthographic projection of the electrode layer on the first base is outside the light-transmitting area.

16 Claims, 3 Drawing Sheets

(56) References Cited

FOREIGN PATENT DOCUMENTS

| CN | 109407375 A | 3/2019 |
| CN | 209356818 U | 9/2019 |
| CN | 110534550 A | 12/2019 |
| CN | 110908164 A | 3/2020 |
| CN | 111025784 A | 4/2020 |
| CN | 111584566 A | 8/2020 |
| CN | 112085006 A | 12/2020 |
| CN | 112180633 A | 1/2021 |
| CN | 112558349 A | 3/2021 |
| CN | 113495378 A | 10/2021 |
| JP | 2000047189 A | 2/2000 |

OTHER PUBLICATIONS

Written Opinion of the International Search Authority in International application No. PCT/CN2021/132506, dated Jul. 27, 2022.
Chinese Office Action issued in corresponding Chinese Patent Application No. 202111350138.0 dated Aug. 19, 2022, pp. 1-9.
Chinese Office Action issued in corresponding Chinese Patent Application No. 202111350138.0 dated Nov. 7, 2022, pp. 1-5.
Chinese Decision of Rejection issued in corresponding Chinese Patent Application No. 202111350138.0 dated Mar. 4, 2023, pp. 1-6.

* cited by examiner

DISPLAY PANEL, DISPLAY DEVICE, AND VEHICLE MONITORING DEVICE

FIELD

The present disclosure relates to the field of display technologies, and more particularly, to a display panel, a display device, and a vehicle monitoring device.

BACKGROUND

Driver monitor systems (DMSs) are mainly used to monitor driver's fatigue. The DMMs gradually progress and roll out more functions as autonomous driving, internet of vehicles, and relevant techniques become mature. To protect individual privacy, it is necessary to prevent human faces from being directly captured in a visible light environment. Also, sensors are desired to be hidden.

Currently, the most widely used way to monitor driver's states is to use active infrared sensors to collect infrared information within a waveband of 940±10 nm, thereby satisfying requirements of the DMSs. In addition, according to camera under panel (CUP) technologies commonly used in cell phones, the infrared sensors can be integrated into a cluster module and can be hidden in an integrated black structure.

However, because the DMSs collect infrared information within a waveband of 940±10 nm, infrared light intensity is decreased to a certain degree when infrared light passes through a cover glass and a display panel and reaches an infrared sensor below the display panel, affecting an imaging effect of the infrared sensor to a certain degree. Therefore, recognition efficiency of the DMSs is reduced. Even a recognition function of the DMSs fails.

SUMMARY

Embodiments of the present disclosure provide a display panel, a display device, and a vehicle monitoring device to increase infrared light transmittance.

To achieve the above goal, an embodiment of the present disclosure provides a display panel, comprising a display area and a light-transmitting area defined adjacent to the display area;
  wherein the display panel comprises a first base and a second base opposite to each other and a liquid crystal layer disposed between the first base and the second base; and
  the display panel comprises a planarization layer, a passivation layer, and an electrode layer stacked on a side of the first base close to the second base, and an orthographic projection of the electrode layer on the first base is outside the light-transmitting area.

In the display panel provided by the embodiment of the present disclosure, the display panel further comprises an interlayer insulating layer disposed between the first base and the planarization layer, and a projection of the interlayer insulating layer on the first base is at least in the display area.

In the display panel provided by the embodiment of the present disclosure, the interlayer insulating layer is disposed outside the light-transmitting area, and a thickness of the planarization layer in the light-transmitting area is greater than a thickness of the planarization layer in the display area.

In the display panel provided by the embodiment of the present disclosure, the thickness of the planarization layer in the light-transmitting area is equal to a sum of the thickness of the planarization layer in the display area and a thickness of the interlayer insulating layer in the display area.

In the display panel provided by the embodiment of the present disclosure, an orthographic projection of the passivation layer on the first base is outside the light-transmitting area.

In the display panel provided by the embodiment of the present disclosure, the electrode layer comprises a first electrode layer and a second electrode layer, the first electrode layer is disposed on a side of the passivation layer close to the planarization layer, the second electrode layer is disposed on a side of the passivation layer away from the planarization layer; and wherein an orthographic projection of the first electrode layer on the first base and an orthographic projection of the second electrode layer on the first base are in the display area.

In the display panel provided by the embodiment of the present disclosure, the display panel further comprises a black matrix disposed on a side of the second base close to the first base, and an orthographic projection of the black matrix on the second base is located in the display area.

In the display panel provided by the embodiment of the present disclosure, the display panel further comprises a spacer layer disposed between the first base and the second base, and an orthographic projection of the spacer layer on the second base is located in the display area.

In the display panel provided by the embodiment of the present disclosure, the display panel further comprises a plurality of metal wires disposed between the first base and the second base, and the metal wires are disposed on a periphery of the light-transmitting area; and wherein at least some of the metal wires have a part close to the light-transmitting area being bent along a direction away from the light-transmitting area.

In the display panel provided by the embodiment of the present disclosure, the display panel further comprises an optical coating layer disposed on a side of the first base away from the second base, and a refractive index of the optical coating layer ranges from 1 to 1.5.

In the display panel provided by the embodiment of the present disclosure, the display panel further comprises a color resist layer, and the color resist layer comprises a plurality of sub-color resists spacedly arranged in the display area and the light-transmitting area; and wherein an arrangement density of the sub-color resists in the display area is greater than an arrangement density of the sub-color resists in the light-transmitting area.

An embodiment of the present disclosure further provides a display device, comprising an infrared sensor and a display panel, wherein the display panel comprises a display area and a light-transmitting area defined adjacent to the display area; the display panel comprises a first base and a second base opposite to each other and a liquid crystal layer disposed between the first base and the second base;
  the display panel comprises a planarization layer, a passivation layer, and an electrode layer stacked on a side of the first base close to the second base, and an orthographic projection of the electrode layer on the first base is outside the light-transmitting area; and
  the infrared sensor corresponds to the light-transmitting area and is disposed on a side of the first base of the display panel away from the second base.

In the display device provided by the embodiment of the present disclosure, the display panel further comprises an interlayer insulating layer disposed between the first base and the planarization layer, and a projection of the interlayer insulating layer on the first base is at least in the display area.

In the display device provided by the embodiment of the present disclosure, the interlayer insulating layer is disposed outside the light-transmitting area, and a thickness of the planarization layer in the light-transmitting area is greater than a thickness of the planarization layer in the display area.

In the display device provided by the embodiment of the present disclosure, the thickness of the planarization layer in the light-transmitting area is equal to a sum of the thickness of the planarization layer in the display area and a thickness of the interlayer insulating layer in the display area.

In the display device provided by the embodiment of the present disclosure, an orthographic projection of the passivation layer on the first base is outside the light-transmitting area.

In the display device provided by the embodiment of the present disclosure, the electrode layer comprises a first electrode layer and a second electrode layer, the first electrode layer is disposed on a side of the passivation layer close to the planarization layer, the second electrode layer is disposed on a side of the passivation layer away from the planarization layer; and wherein an orthographic projection of the first electrode layer on the first base and an orthographic projection of the second electrode layer on the first base are in the display area.

In the display device provided by the embodiment of the present disclosure, the display panel further comprises a black matrix disposed on a side of the second base close to the first base, and an orthographic projection of the black matrix on the second base is located in the display area.

In the display device provided by the embodiment of the present disclosure, the display panel further comprises a spacer layer disposed between the first base and the second base, and an orthographic projection of the spacer layer on the second base is located in the display area.

An embodiment of the present disclosure further provides a vehicle monitoring device, comprising any one of the above-mentioned display devices.

Regarding the beneficial effects: embodiments of the present disclosure provide a display panel, a display device, and a vehicle monitoring device. The display panel comprises a display area and a light-transmitting area defined adjacent to the display area. The display panel comprises a first base and a second base opposite to each other and a liquid crystal layer disposed between the first base and the second base The display panel comprises a planarization layer, a passivation layer, and an electrode layer stacked on a side of the first base close to the second base. Further, an orthographic projection of the electrode layer on the first base is outside the light-transmitting area. Therefore, infrared light transmittance of the light-transmitting area of the display panel is increased.

DESCRIPTION OF DRAWINGS

Technical solutions and beneficial effects of the present disclosure are illustrated below in detail in conjunction with drawings and specific embodiments.

DETAILED DESCRIPTION

The present disclosure provides a display panel, a display device, and a vehicle monitoring device. Embodiments are further described below in detail with reference to accompanying drawings to make objectives, technical solutions, and effects of the present disclosure clearer and more precise. It should be noted that described embodiments are merely used to construct the present disclosure and are not intended to limit the present disclosure.

Embodiments of the present disclosure provide a display panel, a display device, and a vehicle monitoring device which are described below in detail. It should be noted that the description order of embodiments does not mean preferred orders of the embodiments.

Figure 1:
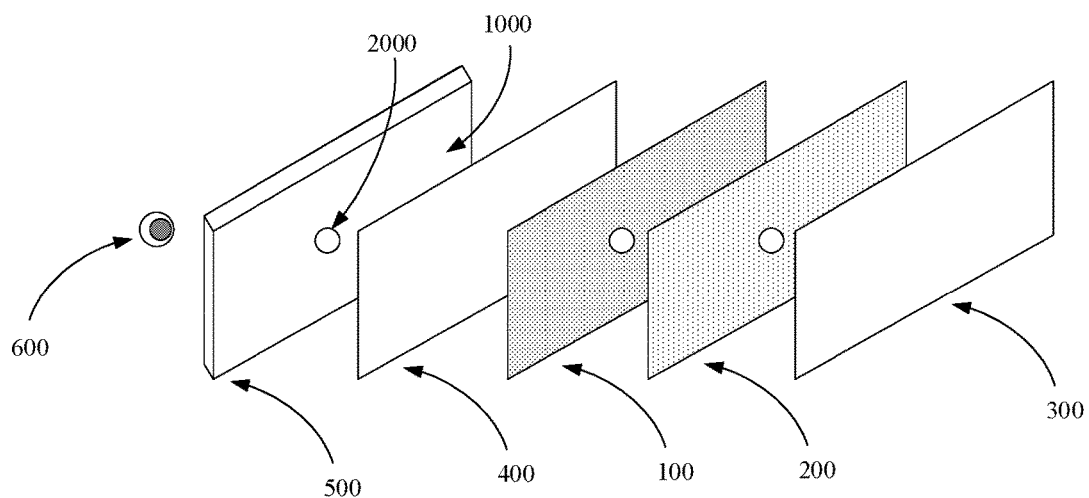
FIG. 1 is a structural schematic view showing a conventional display device.

Please refer to FIG. 1, a structural schematic view showing a conventional display device is provided.

Currently, driver monitor systems (DMSs) are mainly used to monitor driver's fatigue. The most widely used way to monitor a driver's state is to use active infrared sensors to collect infrared information within a waveband of 940±10 nm, thereby satisfying requirements of the DMSs.

In conventional technologies, a vehicle monitoring device comprises a DMS and a display device. The display device comprises a display panel, a first polarizer 300 disposed on a side of the display panel, a second polarizer 400 disposed on another side of the display panel, and a blacklight source 500 and an infrared light sensor 600 disposed on a side of the second polarizer 400 away from the display panel.

The display panel comprises a display area 1000 and a light-transmitting area 2000 adjacent to the display area 1000. The display panel comprises a first substrate 100 and a second substrate 200 disposed opposite to each other and a liquid crystal layer (not shown) disposed between the first substrate 100 and the second substrate 200. Wherein, the infrared sensor 600 corresponds to the light-transmitting area 2000 and is used to collect infrared information.

However, because the DMSs collect infrared information within a band of 940±10 nm, infrared light intensity is decreased to a certain degree when infrared light passes through a cover glass and the display panel and reaches the infrared sensor 600 below the display panel, affecting an imaging effect of the infrared sensor 600 to a certain degree. Therefore, recognition efficiency of the DMSs is reduced. Even a recognition function of the DMSs fails. As such, embodiments of the present disclosure provide a display panel, a display device, and a vehicle monitoring device to effectively increase infrared light transmittance.

Please refer to FIGS. 2 to 5, the present disclosure provides a display panel, a display device, and a vehicle monitoring device. A display panel 10 includes a display area 1000 and a light-transmitting area 2000 adjacent to the display area 1000. The display panel 10 includes a first base 11 and a second base 21 opposite to each other and a liquid crystal layer (not shown) disposed between the first base 11 and the second base 21. Wherein, the display panel 10 includes a planarization layer 15, a passivation layer 16, and an electrode layer 17 stacked on a side of the first base 11 close to the second base 21. Wherein, an orthographic projection of the electrode layer 17 on the first base 11 is outside the light-transmitting area 2000.

In the present disclosure, the planarization layer 15, the passivation layer 16, and the electrode layer 17 are disposed in the display area 1000. Wherein, the orthographic projection of the electrode layer 17 on the first base 11 is outside the light-transmitting area 2000, thereby increasing infrared light transmittance of the light-transmitting area of the display panel.

Technical solutions of the present disclosure are described in conjunction with specific embodiments.

Figure 2:
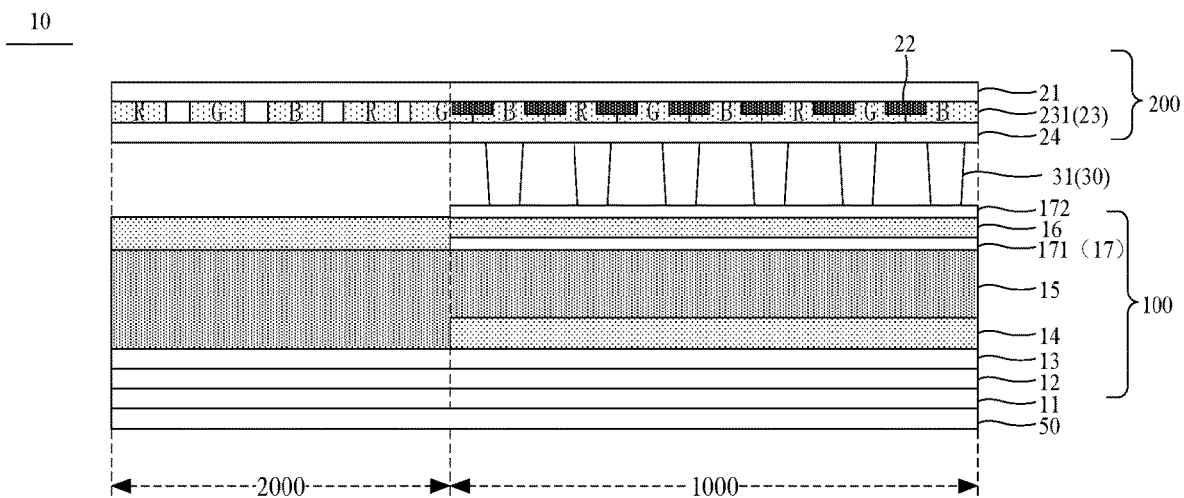
FIG. 2 is a first partly structural schematic view showing a display panel provided by an embodiment of the present disclosure.

Please refer to FIG. 2, a first partly structural schematic view showing the display panel provided by the embodiment of the present disclosure is provided.

The present embodiment provides the display panel. The display panel 10 includes, but is not limited to, a light-emitting diode (LED) display panel. The present embodiment does not limit the display panel 10. Wherein, the display panel 10 includes, but is not limited to, stacked common layers including a gate, an active layer, and a source/drain layer, which are not described in detail here. It should be noted that the display panel of the present embodiment is the LED display panel which is taken as an example to describe technical solutions of the present disclosure.

In the present embodiment, the display panel 10 includes the display area 1000 and the light-transmitting area 2000 adjacent to the display area 1000. The display panel 10 includes a first substrate 100 and a second substrate 200 opposite to each other and a liquid crystal layer (not shown) disposed between the first substrate 100 and the second substrate 200.

In the present embodiment, it should be noted that the first substrate 100 includes, but is not limited to an array substrate, and the second substrate 100 includes, but is not limited to a color filter substrate. In the present embodiment, the first substrate 100 is the array substrate, and the second substrate 200 is the color filter substrate, which are taken as examples to describe technical solutions of the present disclosure.

In the present embodiment, the first substrate 100 includes the first base 11, the second substrate 200 includes the second base 21, and the display panel 10 includes the planarization layer 15, the passivation layer 16, and the electrode layer 17 stacked on the side of the first base 11 close to the second base 21. Wherein, the orthographic projection of the electrode layer 17 on the first base 11 is outside the light-transmitting area 2000.

Wherein, the first base 11 and the second base 21 both include a rigid substrate or a flexible substrate. When the first base 11 and the second base 21 are rigid substrates, a material thereof may be metal or glass. When the first base 11 and the second base 21 are flexible substrates, a material thereof may include at least one of an acrylic resin, a methacrylic resin, polyisoprene, a vinyl resin, an epoxy-based resin, a polyurethane-based resin, a cellulose resin, a siloxane resin, a polyimide-based resin, or a polyamide-based resin. A material of the passivation layer 16 includes, but is not limited to, silicon oxide, silicon nitride, silicon oxynitride, or a stacked layer thereof. A material of the electrode layer 17 includes, but is not limited to, metal such as Cu, Al, and Ag. The present embodiment does not limit the material of the first base 11, the material of the second base 21, the material of the passivation layer 16, and the material of the electrode layer 17.

Furthermore, the first base 100 further includes a buffer layer 12 and a gate insulating layer 13 disposed between the first base 11 and the planarization layer 15. Wherein, a material of the buffer layer 12 includes, but is not limited to, silicon oxide and silicon nitride. The gate insulating layer 13 has a strong moisture and oxygen blocking capability and a strong insulating capability. A material of the gate insulating layer 13 includes, but is not limited to, silicon oxide, silicon nitride, silicon oxynitride, or a stacked layer thereof.

TABLE 1

| | layer structure | infrared light transmittance |
|---|---|---|
| first substrate | buffer layer | >90% |
| | between buffer layer and interlayer insulating layer | >90% |
| | between buffer layer and planarization layer | >90% |
| | between buffer layer and passivation layer | 60% to 90% |
| | between buffer layer and electrode layer | 40% to 70% |

Please refer to table 1, a data table showing infrared light transmittance of each layer of the first base 11 of a conventional display panel provided by the embodiment of the present disclosure is provided.

In the conventional display panel, infrared light transmittance of the buffer layer 12 is greater than 90%, infrared light transmittance between the buffer layer 12 and the planarization layer 15 is greater than 90%, infrared light transmittance between the buffer layer 12 and the passivation layer 16 ranges from 60% to 90%, and infrared light transmittance between the buffer layer 12 and the electrode layer 17 ranges from 40% to 70%.

According to data provided by table 1, in the conventional display panel, the electrode layer 17 will shield infrared light. That is, when infrared light passes through the electrode layer 17, intensity of the infrared light will be decreased to a certain degree.

In the present embodiment, the electrode layer 17 includes a first electrode layer 171 disposed on a side of the passivation layer 16 close to the first base 11, and a second electrode layer 172 disposed on a side of the passivation layer 16 away from the first base 11. An orthographic projection of the first electrode layer 171 on the first base 11 and an orthographic projection of the second electrode layer 172 on the first base 11 are in the display area 1000. It should be noted that the first electrode layer 172 includes, but is not limited to, a pixel electrode layer. The present embodiment does not limit the first electrode layer 172.

It should be understood that the planarization layer 15, the passivation layer 16, and the electrode layer 17 are stacked in the display area 1000. The planarization layer 15 is disposed in the light-transmitting area 2000. Wherein, an orthographic projection of the electrode layer 17 on the first base 11 is outside the light-transmitting area 2000. By removing part of the first electrode layer 171 in the light-transmitting area 2000 and part of the second electrode layer 172 in the light-transmitting area 2000, infrared light transmittance of the light-transmitting area 2000 can be increased.

Moreover, please refer to FIG. 2 and table 1. The display panel further includes an interlayer insulating layer 14 disposed between the first base 11 and the planarization layer 15. An orthographic projection of the interlayer insulating layer 14 on the first base 11 is at least in the display area 1000. The infrared light transmittance between the buffer layer 12 and the interlayer insulating layer 14 is greater than 90%. It should be noted that, although the infrared light transmittance is not affected by the interlayer insulating layer 14 in this test, the interlayer insulating layer 14 will theoretically reduce the infrared light transmittance because of a thickness of a layer, a material of a layer, and personal factors.

As noted above, in the present embodiment, the interlayer insulating layer 14 is disposed in the display area 1000. A thickness of the planarization layer 15 in the light-transmitting area 2000 is greater than a thickness of the planarization layer 15 in the display area 1000. Furthermore, the thickness of the planarization layer 15 in the light-transmitting area 2000 is equal to a sum of the thickness of the planarization layer 15 in the display area 1000 and a thickness of the interlayer insulating layer 14 in the display area 1000. It should be understood that, in the present embodiment, by removing part of the interlayer insulating layer 14 in the light-transmitting area 2000, the infrared light transmittance of the light-transmitting area 2000 can be further increased.

It should be noted that the feature "the thickness of the planarization layer 15 in the light-transmitting area 2000 is equal to a sum of the thickness of the planarization layer 15 in the display area 1000 and a thickness of the interlayer insulating layer 14 in the display area 1000" is only an example for description. The present embodiment is not limited to this feature.

In the present embodiment, the display panel 10 further includes a black matrix 22 disposed on a side of the second base 21 close to the first substrate 100. A projection of the black matrix 22 on second substrate 200 is located in the display area 1000. The second substrate 200 further includes a color resist layer 23. The color resist layer 23 is disposed on a side of the black matrix 22 close to the first substrate 100. Wherein, the color resist layer 23 includes a plurality of sub-color resists 231 spacedly arranged in the display area 1000 and the light-transmitting area 2000. It should be noted that the sub-color resists 231 include, but are not limited to, a red sub-color resist R, a green sub-color resist R, and a bleu sub-color resist B. The black matrix 22 is disposed between two adjacent sub-color resists 231 and is configured to define a boundary between the sub-color resists 231. Furthermore, to prevent light leaking from between the sub-color resists 231 adjacent to each other. Typically, an edge of the sub-color resists 231 is arranged to overlap the black matrix 22.

It should be noted that, in the present embodiment, the second substrate 200 includes the color resist layer 23. The feature "The color resist layer 23 is disposed on a side of the black matrix 22 close to the first substrate 100" is only an example for description. In one embodiment, the color resist layer 23 may also be disposed on a side of the first base 11 close to the second base 200. That is, the first base 100 includes the color resist layer 23.

It should be understood that, in the present embodiment, the display panel 10 further includes a photoresist layer 24 disposed on a side of the color resist layer 23 close to the first substrate 100. It should be understood that, in the present embodiment, the edge of the sub-color resists 231 overlaps the black matrix 22. Therefore, a horn-shaped gap may be formed in the overlapping area because the sub-color resists 231 may be stacked on the overlapping area. Heavily stacked sub-color resists 231 will cause a relief on a side of the second substrate 200 close to the first substrate 100, affecting an orientation of liquid crystals around the stacked sub-color resists 231 and reducing efficiency of the liquid crystals. In the present disclosure, the photoresist layer 24 is disposed on the side of the color resist layer 23 close to the first substrate 100, thereby ensuring flatness of the color resist layer 23.

Moreover, in the present embodiment, an arrangement density of the sub-color resists 231 in the display area 1000 is greater than an arrangement density of the sub-color resists 231 in the light-transmitting area 2000. That is, the sub-color resists 231 are densely distributed in the display area 1000 and are sparsely distributed in the light-transmitting area 2000. Therefore, in the light-transmitting area 2000, an area of an interval between adjacent sub-color resists 231 is increased, thereby increasing the infrared light transmittance of the light-transmitting area 2000.

TABLE 2

| | layer structure | infrared light transmittance |
|---|---|---|
| second substrate | black matrix | <10% |
| | red sub-color resist | >90% |
| | green sub-color resist | >90% |
| | blue sub-color resist | >90% |

Please refer to table 2, a data table showing infrared light transmittance of each layer of the second base 21 of the conventional display panel provided by the embodiment of the present disclosure is provided.

In the conventional display panel, infrared light transmittance of the black matrix 22 is less than 10%, infrared light transmittance of the red sub-color resist R is greater than 90%, infrared light transmittance of the green sub-color resist G is greater than 90%, and infrared light transmittance of the blue sub-color resist B is greater than 90%.

According to data provided by table 2, in the conventional display panel, infrared light transmittance is significantly affected by the black matrix 22.

It should be understood that, compared with the conventional display panel, in the present embodiment, an orthographic projection of the black matrix 22 on the second substrate 200 is located in the display area 1000, and the light-transmitting area 2000 is not provided with the black matrix 22. Therefore, the infrared light transmittance of the light-transmitting area 2000 is increased. Furthermore, by spacedly arranging the color resist layer 23 in the light-transmitting area 2000, an integrated black structure of the display panel can be better formed. Moreover, the infrared light transmittance of the color resist 23 is greater than 90%. An effect of the color resist 23 shielding infrared light can be ignored.

It should be noted that the infrared light transmittance of each layer of the first substrate 100 of the conventional display panel noted in table 1 and the infrared light transmittance of each layer of the second substrate 200 of the conventional display panel noted in table 2 are only reference data which may be changed because of an environment, a material of each layer, and personal factors. Data provided by the present embodiment are only examples for description.

Furthermore, in the present embodiment, the display panel 10 further includes a spacer layer 30 disposed between the first base 11 and the second base 21. A projection of the spacer layer 30 on the second substrate 200 is located in the display area 1000. Specifically, the spacer layer 30 is disposed between the first substrate 100 and the second substrate 200. The spacer layer 30 includes a plurality of spacers 31 which is ring-shaped and surrounds the light-transmitting area 2000. Wherein, the spacers 31 are conical frustumshaped. Moreover, the spacers 31 are upside down disposed between the first substrate 100 and the second substrate 200. That is, an end, which has a greater radius, of the spacers 31 contacts the second substrate 200, and an end, which has a smaller radius, of the spacers 31 contacts the first substrate 100, thereby realizing a great supporting effect. Also, the spacers 31 surround the light-transmitting area 2000, thereby preventing bad phenomena, such as diffraction, from occurring on the spacer layer 30 after infrared light enters the display panel.

Figure 3:
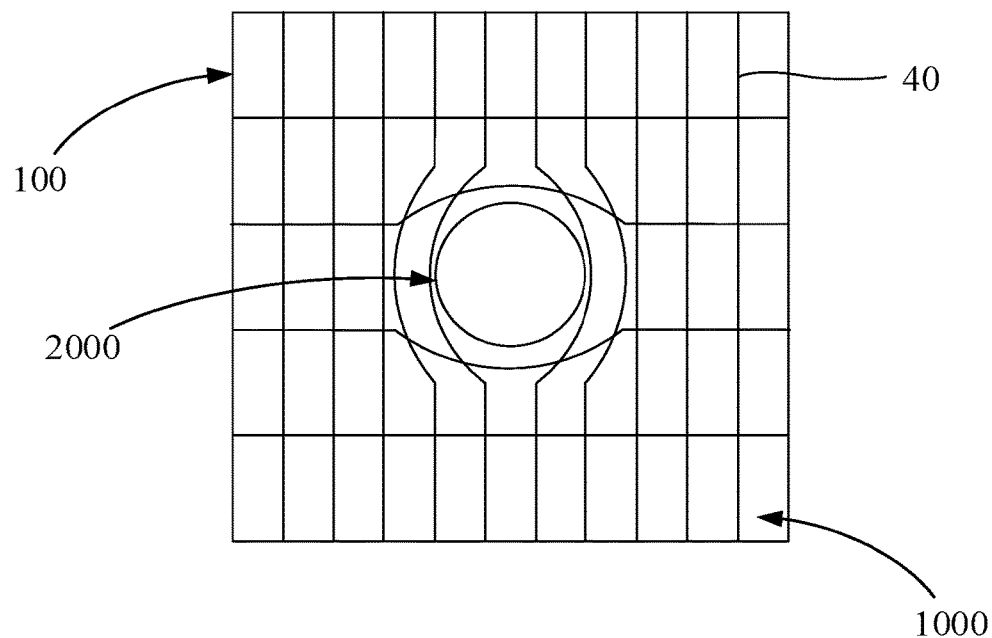
FIG. 3 is a top view showing the display panel provided by the embodiment of the present disclosure.

Please refer to FIG. 2 and FIG. 3. Wherein, FIG. 3 is a top view showing part of the display panel provided by the embodiment of the present disclosure.

In the present embodiment, the display panel 10 further includes a plurality of metal wires 40 disposed between the first base 11 and the second base 21. The metal wires 40 are disposed on a periphery of the light-transmitting area 2000. Wherein, at least some of the metal wires 40 have a part close to the light-transmitting area 2000 being bent along a direction away from the light-transmitting area 2000.

Specifically, the display panel 10 further includes a plurality of metal wires 40 disposed between the first base 11 and the second base 12. The metal wires 40 are disposed on the periphery of the light-transmitting area 2000. Wherein, at least some of the metal wires 40 have a part close to the light-transmitting area 2000 being bent along a direction away from the light-transmitting area 2000. It should be understood that, in the present embodiment, any one of metal wires 40 has a part close to the light-transmitting area 2000 being bent along a direction away from the light-transmitting area 2000. That is, the light-transmitting area 2000 is not shielded by the metal wires 40, thereby preventing infrared light passing through the light-transmitting area 200 from being shielded by the metal wires 40. As such, the infrared light transmittance of the light-transmitting area 2000 is increased.

Moreover, in the present embodiment, the display panel 10 further includes an optical coating layer 50 disposed on a side of the first base 11 away from the second base 21. A thickness of the optical coating layer 50 is $\lambda/4$. Wherein, $\lambda$ is a wavelength of red light. Specifically, in the present embodiment, $\lambda$ is 940±10 nm and is a wavelength of infrared light, and the thickness of the optical coating layer 50 is 235 nm.

In the present embodiment, the optical coating layer 50 is disposed on a side of the first substrate 100 away from the second substrate 200. A material of the optical coating layer 50 includes, but is not limited to, magnesium fluoride, zirconium dioxide, and silicon dioxide. A refractive index of the optical coating layer 50 ranges from 1 to 1.5. The optical coating layer 50 has a structure including multiple high refractive index films and multiple low refractive index films, which are alternately disposed on one another. This structure can reduce reflection of infrared light on the optical coating layer 50, thereby effectively increasing infrared light transmittance.

It should be noted that a thickness of the optical coating layer 50 can be determined according to light in different wavebands, and a refractive index of a material of the optical coating layer 50 and a number of the optical coating layer 50 can be determined according to different interfaces. In the present embodiment, the wavelength $\lambda$ of infrared light is 940±10 nm, and the thickness of the optical coating layer 50 is 235 nm, which are taken as examples for description.

Figure 4:
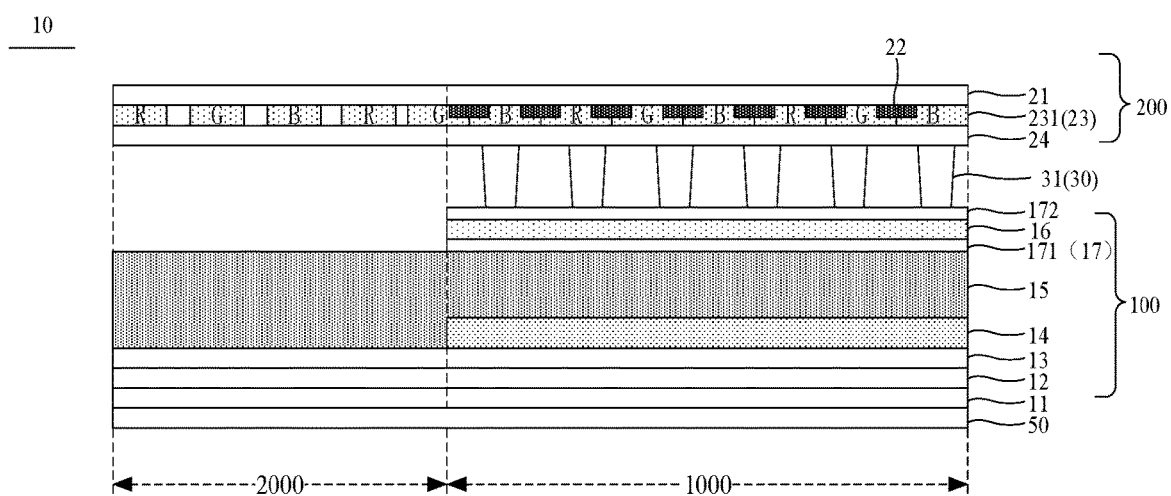
FIG. 4 is a second partly structural schematic view showing the display panel provided by the embodiment of the present disclosure.

Please refer to FIG. 4, a second partly structural schematic view showing the display panel provided by the embodiment of the present disclosure is provided.

The structure of the display panel of the present embodiment and the first structure of the display panel of the above embodiment are similar or the same, which can be referred to description of the display panel of the above embodiment and is not described here again. A difference between the present embodiment and the above embodiment is:

In the present embodiment, the orthographic projection of the passivation layer 16 on the first base 11 is outside the light-transmitting area 2000.

Specifically, according to data provided by table 1, in the conventional display panel, infrared light will be shielded by the passivation layer 16. That is, when infrared light passes through the passivation layer 16, intensity of the infrared light will be reduced to a certain degree.

It should be understood that, in the present embodiment, the orthographic projection of the passivation layer 16 on the first base 11 is outside the light-transmitting area 2000. By removing part of the passivation layer 16 in the light-transmitting area 2000, the infrared light transmittance of the light-transmitting area 2000 can be further increased.

Figure 5:
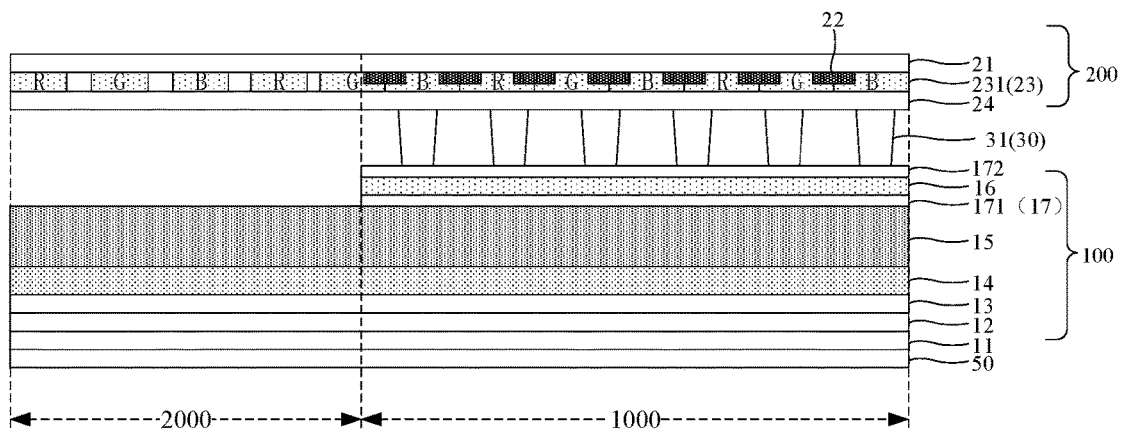
FIG. 5 is a third partly structural schematic view showing the display panel provided by the embodiment of the present disclosure.

Please refer to FIG. 5, a third partly structural schematic view showing the display panel provided by the embodiment of the present disclosure is provided.

The structure of the display panel of the present embodiment and the first structure of the display panel of the above embodiment are similar or the same, which can be referred to description of the display panel of the above embodiment and is not described here again. A Difference between the present embodiment and the above embodiment is:

In the present embodiment, the interlayer insulating layer 14 and the planarization layer 15 are an integrated structure. The interlayer insulating layer 14 and the planarization layer 15 are disposed in the display area 1000 and the light-transmitting area 2000, thereby further ensuring flatness of the first substrate 100.

Figure 6:
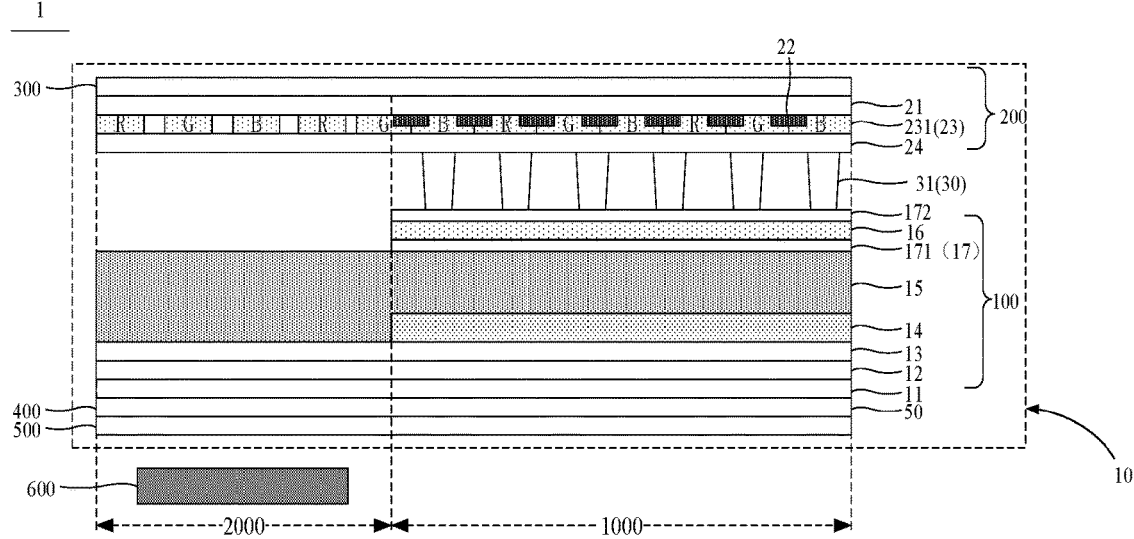
FIG. 6 is a partly structural schematic view showing a display device provided by an embodiment of the present disclosure.

Please refer to FIG. 6, a structural schematic view showing the display device provided by the embodiment of the present disclosure is provided.

The present embodiment provides a display device 1. The display device 1 includes any one of the display panels 10 of the above-mentioned embodiments and an infrared sensor 600. The infrared sensor 600 is disposed in the light-transmitting area 2000. Furthermore, the infrared sensor 600 is disposed on the side of the first base 11 of the display panel away from the second base 21.

Specifically, the display device 1 further includes a first polarizer 300 disposed on a side of the display panel 10, a second polarizer 400 disposed on another side of the display panel 10, and a backlight source 500 disposed between the second polarizer 400 and the infrared sensor 600.

It should be understood that, in the present embodiment, the color resist layer 23 are spacedly arranged in the light-transmitting area 2000, thereby shielding the infrared sensor 600. As such, the display panel 10 can have a better integrated black structure.

It should be noted that, in the present embodiment, the infrared sensor 600 collects infrared information having a waveband of 940±10 nm. In specific applications, the display device 1 may be a display screen of a device such as a smartphone, a tablet, a notebook, a smart wristband, a smartwatch, smart glasses, a smart helmet, a desktop computer, a smart television, or a digital camera. Moreover, the display device 1 can be applied to an electronic device having a flexible display screen.

The present embodiment provides a vehicle monitoring device. The vehicle monitoring device includes a DMS and any one of the display devices of the above-mentioned embodiments.

Please refer to FIG. 2, FIG. 3, and FIG. 6. In the present embodiment, the DMS includes, but is not limited to, a smoking monitoring module, a call monitoring module, a distraction monitoring module, and an unfastened seat belt monitoring module. The infrared sensor 600 collects infrared information having a waveband of 940±10 nm. Wherein, the DMS realizes a monitoring function according to infrared information having a waveband of 940±10 nm collected by the infrared sensor 600.

It should be understood that the display panel has been illustrated in detail in the above-mentioned embodiments and is not described here again.

In the present embodiment, part of the passivation layer 16 in the light-transmitting area 2000 is removed, and part of the electrode layer 17 in the light-transmitting area 2000 is removed. Therefore, the infrared light transmittance of the light-transmitting area 2000 can be increased. Furthermore, the projection of the black matrix 22 on the second substrate 200 is located in the display area 1000. The light-transmitting area 2000 is not provided with the black matrix. Thus, the infrared light transmittance of the light-transmitting area 2000 can be further increased. Moreover, the spacers 31 surround the light-transmitting area 2000, thereby preventing bad phenomena, such as diffraction, from occurring on the spacer layer 30 after infrared light enters the display panel. It should be understood that, in the present embodiment, the infrared light transmittance of the light-transmitting area 2000 is increased, thereby improving an imaging effect of the infrared sensor 600, allowing the DMS to monitor more precisely and faster. In addition, in the present embodiment, the color resist layer 23 is further disposed in the light-transmitting area 2000, thereby shielding the infrared sensor 600. Au such, the display panel 10 can have a better integrated black structure.

In summary, the present disclosure provides the display panel, the display device, and the vehicle monitoring device. The display panel 10 includes the display area 1000 and the light-transmitting area 2000 adjacent to the display area 1000. The display panel 10 includes the first base 11 and the second base 21 opposite to each other and a liquid crystal layer disposed between the first base 11 and the second base 21. The planarization layer 15, the passivation layer 16, and the electrode layer 17 are disposed on the side of the first base 11 close to the second base 21. Wherein, the display panel 10 includes the planarization layer 15, the passivation layer 16, and the electrode layer 17 stacked on the side of the first base 11 close to the second base 21. Wherein, the orthographic projection of the passivation layer 16 on the first base 11 and the orthographic projection of the electrode layer 17 on the first base 11 are outside the light-transmitting area 2000. In the present disclosure, by disposing the planarization layer 15, the passivation layer 16, and the electrode layer 17 in the display area 1000 and disposing the planarization layer 15 in the light-transmitting area 2000, the infrared light transmittance of the light-transmitting area 2000 of the display panel 10 can be increased.

It should be noted that many changes and modifications to the described embodiments can be carried out by those skilled in the art, and all such changes and modifications are intended to be included within the scope of the appended claims.

What is claimed is:

1. A display panel, comprising a display area and a light-transmitting area defined adjacent to the display area;
   wherein the display panel comprises a first base and a second base opposite to each other and a liquid crystal layer disposed between the first base and the second base; and
   the display panel comprises a planarization layer, a passivation layer, and an electrode layer stacked on a side of the first base close to the second base, and an orthographic projection of the electrode layer on the first base is outside the light-transmitting area,
   wherein the display panel further comprises an interlayer insulating layer disposed between the first base and the planarization layer, and a projection of the interlayer insulating layer on the first base is located at least in the display area,
   wherein the interlayer insulating layer is disposed outside the light-transmitting area, and a thickness of the planarization layer in the light-transmitting area is greater than a thickness of the planarization layer in the display area.

2. The display panel of claim 1, wherein the thickness of the planarization layer in the light-transmitting area is equal to a sum of the thickness of the planarization layer in the display area and a thickness of the interlayer insulating layer in the display area.

3. The display panel of claim 1, wherein an orthographic projection of the passivation layer on the first base is outside the light-transmitting area.

4. The display panel of claim 1, wherein the electrode layer comprises a first electrode layer and a second electrode layer, the first electrode layer is disposed on a side of the passivation layer close to the planarization layer, the second electrode layer is disposed on a side of the passivation layer away from the planarization layer; and
   wherein an orthographic projection of the first electrode layer on the first base and an orthographic projection of the second electrode layer on the first base are located in the display area.

5. The display panel of claim 1, wherein the display panel comprises a black matrix disposed on a side of the second base close to the first base, and an orthographic projection of the black matrix on the second base is located in the display area.

6. The display panel of claim 1, wherein the display panel comprises a spacer layer disposed between the first base and the second base, and an orthographic projection of the spacer layer on the second base is located in the display area.

7. The display panel of claim 1, wherein the display panel comprises a plurality of metal wires disposed between the first base and the second base, and the metal wires are disposed on a periphery of the light-transmitting area; and
   wherein at least some of the metal wires have a part close to the light-transmitting area being bent along a direction away from the light-transmitting area.

8. The display panel of claim 1, wherein the display panel comprises an optical coating layer disposed on a side of the first base away from the second base, and a refractive index of the optical coating layer ranges from 1 to 1.5.

9. The display panel of claim 1, wherein the display panel comprises a color resist layer, and the color resist layer comprises a plurality of sub-color resists spacedly arranged in the display area and the light-transmitting area; and
   wherein an arrangement density of the sub-color resists in the display area is greater than an arrangement density of the sub-color resists in the light-transmitting area.

10. A display device, comprising an infrared sensor and a display panel, wherein the display panel comprises a display area and a light-transmitting area defined adjacent to the display area;
- the display panel comprises a first base and a second base opposite to each other and a liquid crystal layer disposed between the first base and the second base;
- the display panel comprises a planarization layer, a passivation layer, and an electrode layer stacked on a side of the first base close to the second base, and an orthographic projection of the electrode layer on the first base is outside the light-transmitting area; and
- the infrared sensor corresponds to the light-transmitting area and is disposed on a side of the first base of the display panel away from the second base,
- wherein the display panel further comprises an interlayer insulating layer disposed between the first base and the planarization layer, and a projection of the interlayer insulating layer on the first base is located at least in the display area,
- wherein the interlayer insulating layer is disposed outside the light-transmitting area, and a thickness of the planarization layer in the light-transmitting area is greater than a thickness of the planarization layer in the display area.

11. The display device of claim 10, wherein the thickness of the planarization layer in the light-transmitting area is equal to a sum of the thickness of the planarization layer in the display area and a thickness of the interlayer insulating layer in the display area.

12. The display device of claim 10, wherein an orthographic projection of the passivation layer on the first base is outside the light-transmitting area.

13. The display device of claim 10, wherein the electrode layer comprises a first electrode layer and a second electrode layer, the first electrode layer is disposed on a side of the passivation layer close to the planarization layer, the second electrode layer is disposed on a side of the passivation layer away from the planarization layer; and
- wherein an orthographic projection of the first electrode layer on the first base and an orthographic projection of the second electrode layer on the first base are in the display area.

14. The display device of claim 10, wherein the display panel comprises a black matrix disposed on a side of the second base close to the first base, and an orthographic projection of the black matrix on the second base is located in the display area.

15. The display device of claim 10, wherein the display panel comprises a spacer layer disposed between the first base and the second base, and an orthographic projection of the spacer layer on the second base is located in the display area.

16. A vehicle monitoring device, comprising the display device of claim 10.

* * * * *